United States Patent
Stein

(10) Patent No.: US 12,252,064 B2
(45) Date of Patent: Mar. 18, 2025

(54) METHOD FOR OBJECT TRACKING AT LEAST ONE OBJECT, CONTROL DEVICE FOR CARRYING OUT A METHOD OF THIS KIND, OBJECT TRACKING DEVICE HAVING A CONTROL DEVICE OF THIS KIND AND MOTOR VEHICLE HAVING AN OBJECT TRACKING DEVICE OF THIS KIND

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 36 days.

(21) Appl. No.: 18/043,138

(22) PCT Filed: Jun. 28, 2021

(86) PCT No.: PCT/EP2021/067658
§ 371 (c)(1),
(2) Date: Feb. 27, 2023

(87) PCT Pub. No.: WO2022/042902
PCT Pub. Date: Mar. 3, 2022

(65) Prior Publication Data
US 2023/0302987 A1    Sep. 28, 2023

(30) Foreign Application Priority Data
Aug. 31, 2020    (DE) .................... 10 2020 005 343.2

(51) Int. Cl.
*B60Q 1/08*    (2006.01)
*G06T 7/70*    (2017.01)
*G06V 20/58*   (2022.01)

(52) U.S. Cl.
CPC .............. *B60Q 1/085* (2013.01); *G06T 7/70* (2017.01); *G06V 20/58* (2022.01); *B60Q 2300/45* (2013.01); *G06T 2207/30252* (2013.01)

(58) Field of Classification Search
CPC ...... B60Q 1/085; B60Q 2300/45; G06T 7/70; G06T 2207/30252; G06V 20/58
See application file for complete search history.

(56) References Cited

U.S. PATENT DOCUMENTS 5,309,137 A * 5/1994 Kajiwara ............. G05D 1/0289
                                              348/148
5,555,312 A * 9/1996 Shima .................. G05D 1/0246
                                              382/104

(Continued)

FOREIGN PATENT DOCUMENTS

DE    10 2013 227 101 B3    5/2015
DE    10 2014 208 272 A1   11/2015

(Continued)

OTHER PUBLICATIONS

PCT/EP2021/067658, International Search Report dated Oct. 29, 2021 (Three (3) pages).

(Continued)

*Primary Examiner* — Curtis J King
(74) *Attorney, Agent, or Firm* — Crowell & Moring LLP

(57) ABSTRACT

A method for tracking an object. A first coordinated control of a lighting device and an optical sensor is assigned to a first visible distance range. A first recording of the first visible distance range while illuminated by the lighting device is recorded with the optical sensor. If the object is detected in the first recording within the first visible distance range, a distance between the detected object and the optical sensor is determined. A second coordinated control of the lighting device and the optical sensor and an assigned, second visible (Continued)

distance range are determined such that the object detected in the first recording is located in a center of the second visible distance range. A second recording of the second visible distance range while illuminated by the lighting device is recorded with the optical sensor by the second coordinated control.

7 Claims, 1 Drawing Sheet

(56) References Cited

U.S. PATENT DOCUMENTS

| | | | | |
|---|---|---|---|---|
| 5,892,855 | A * | 4/1999 | Kakinami | G06V 10/48 |
| | | | | 382/104 |
| 6,370,474 | B1 * | 4/2002 | Hiwatashi | G08G 1/22 |
| | | | | 348/148 |
| 6,677,986 | B1 * | 1/2004 | Pochmuller | B60Q 1/1423 |
| | | | | 348/149 |
| 6,765,480 | B2 * | 7/2004 | Tseng | G06V 20/58 |
| | | | | 382/104 |
| 7,567,687 | B2 * | 7/2009 | Kudo | G08G 1/166 |
| | | | | 382/104 |
| 7,623,681 | B2 * | 11/2009 | Miyahara | G06V 10/255 |
| | | | | 382/104 |
| 7,652,686 | B2 * | 1/2010 | Stiller | G08G 1/166 |
| | | | | 348/148 |
| 8,665,079 | B2 * | 3/2014 | Pawlicki | G01S 13/867 |
| | | | | 340/436 |
| 8,970,397 | B2 * | 3/2015 | Nitanda | G01S 17/42 |
| | | | | 340/901 |
| 9,530,063 | B2 * | 12/2016 | Kumano | G06V 20/588 |
| 9,727,792 | B2 * | 8/2017 | Martini | G06V 20/56 |
| 9,845,048 | B1 * | 12/2017 | Tseng | B60Q 1/525 |
| 10,229,596 | B1 * | 3/2019 | Weinberg | G06V 20/58 |
| 10,281,582 | B2 * | 5/2019 | Elooz | G01S 7/486 |
| 11,648,876 | B2 * | 5/2023 | Alahmar | G06T 7/11 |
| | | | | 382/106 |
| 2007/0171431 | A1 * | 7/2007 | Laflamme | G01C 11/02 |
| | | | | 356/602 |
| 2008/0129541 | A1 * | 6/2008 | Lu | G06V 20/56 |
| | | | | 340/905 |
| 2010/0110193 | A1 * | 5/2010 | Kobayashi | G06V 20/58 |
| | | | | 348/149 |
| 2016/0096477 | A1 * | 4/2016 | Biemer | H04N 23/60 |
| | | | | 348/148 |
| 2017/0091565 | A1 * | 3/2017 | Yokoi | G06V 10/25 |
| 2017/0140542 | A1 * | 5/2017 | Hodohara | H04N 25/61 |
| 2017/0293812 | A1 * | 10/2017 | Itoh | G02B 27/283 |
| 2018/0052457 | A1 * | 2/2018 | Kim | B60W 30/00 |
| 2018/0105107 | A1 * | 4/2018 | Hassan-Shafique | G08G 1/164 |
| 2018/0136314 | A1 * | 5/2018 | Taylor | G01S 17/931 |
| 2018/0162274 | A1 * | 6/2018 | Kim | B60R 1/26 |
| 2019/0047518 | A1 * | 2/2019 | Kosiak | B60W 10/30 |
| 2020/0057450 | A1 * | 2/2020 | Calleija | H04N 7/181 |
| 2020/0272831 | A1 * | 8/2020 | Cho | G06T 7/97 |
| 2021/0075961 | A1 * | 3/2021 | Alahmar | G08G 1/165 |
| 2021/0158544 | A1 * | 5/2021 | Steinmeyer | G01S 13/867 |
| 2023/0078063 | A1 * | 3/2023 | Kato | G01S 17/89 |
| | | | | 356/4.01 |
| 2023/0123039 | A1 * | 4/2023 | Wang | G01C 21/28 |
| | | | | 701/431 |
| 2023/0168685 | A1 * | 6/2023 | Calleija | G08G 1/163 |
| | | | | 701/28 |
| 2023/0219532 | A1 * | 7/2023 | Fukumoto | B60S 1/54 |
| | | | | 348/148 |
| 2024/0034372 | A1 * | 2/2024 | Hartmann | B61L 23/041 |
| 2024/0083421 | A1 * | 3/2024 | Fu | G06V 10/143 |

FOREIGN PATENT DOCUMENTS

| | | |
|---|---|---|
| DE | 10 2018 205 879 A1 | 10/2019 |
| DE | 10 2020 002 994 A1 | 7/2020 |
| JP | 2011-84106 A | 4/2011 |
| KR | 10-1253043 B1 | 3/2013 |
| WO | WO 2017/009848 A1 | 1/2017 |

OTHER PUBLICATIONS

Gruber et al., "Gated2Depth: Real-Time Dense Lidar From Gated Images", URL: https://arxiv.org/pdf/1902.04997.pdf, Oct. 2019, Eleven (11) pages).

* cited by examiner

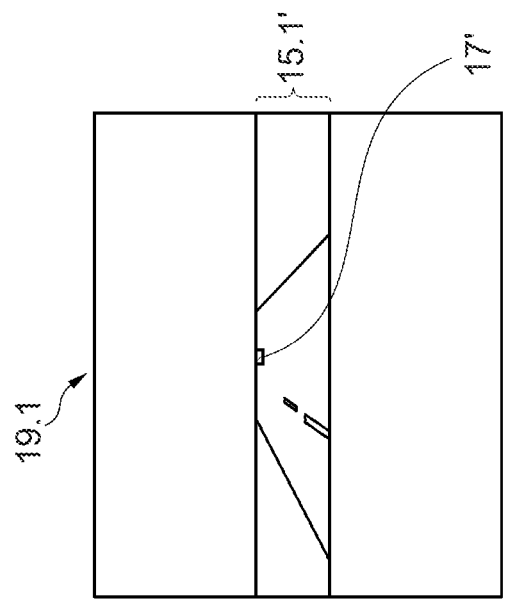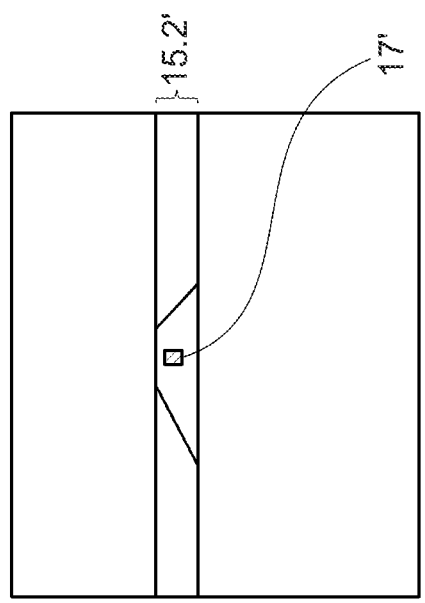
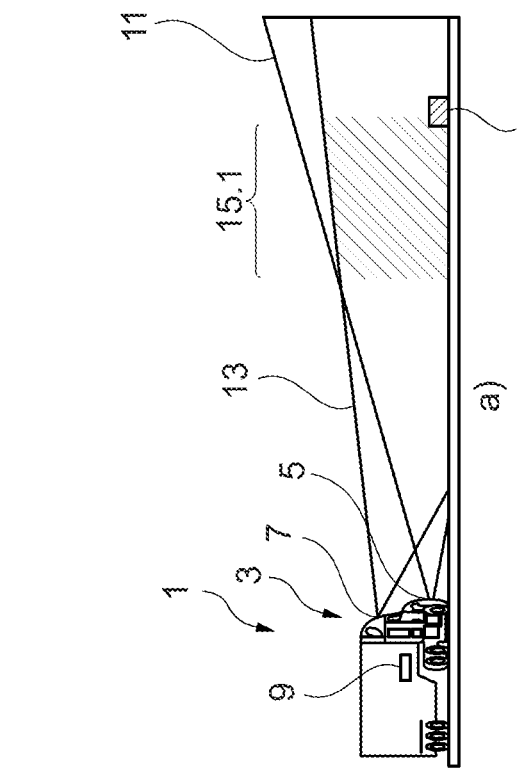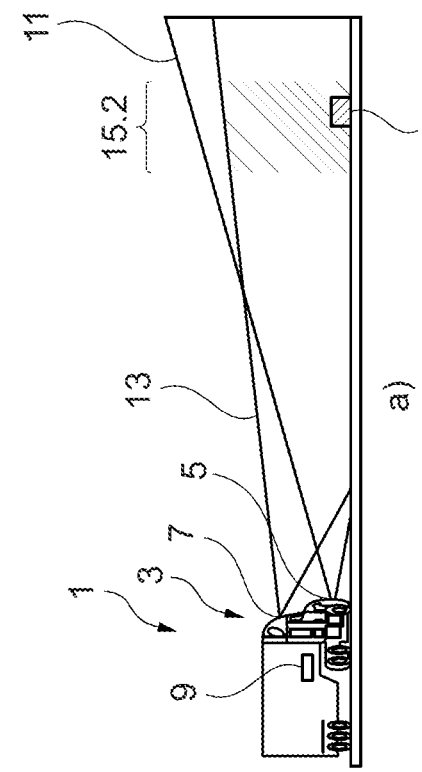
Fig. 1
Fig. 2

METHOD FOR OBJECT TRACKING AT LEAST ONE OBJECT, CONTROL DEVICE FOR CARRYING OUT A METHOD OF THIS KIND, OBJECT TRACKING DEVICE HAVING A CONTROL DEVICE OF THIS KIND AND MOTOR VEHICLE HAVING AN OBJECT TRACKING DEVICE OF THIS KIND

BACKGROUND AND SUMMARY OF THE INVENTION

The invention relates to a method for object tracking at least one object, a control device that is equipped for carrying out a method of this kind, an object tracking device having a control device of this kind and a motor vehicle having an object tracking device of this kind.

Methods for object detection and object tracking by means of a lighting device and an optical sensor are known. A method of this kind proceeds from the international patent application with the publication number WO 2017/009848 A1, in which a lighting device and an optical sensor are controlled while temporally coordinated with one another to record a particular visible distance range in an observation region of the optical sensor, wherein the visible distance range results from the temporal coordination of the control of the lighting device and of the optical sensor. It is disadvantageous in this method that no feedback is carried out between the detected object to be tracked and the lighting device and the optical sensor.

A method for generating a recording having distance information in real time proceeds from the publication "Gated2Depth: Real-Time Dense Lidar From Gated Images" by Tobias Gruber et. al. (arxiv.org/pdf/1902.04997.pdf). It is problematic that this method can only be used for a range of up to 80 m.

The object of this invention is thus to create a method for object tracking at least one object, a control device that is equipped for carrying out a method of this kind, an object tracking device having a control device of this kind and a motor vehicle having an object tracking device of this kind, wherein the specified disadvantages are at least partially alleviated, preferably avoided.

The object is particularly solved by creating a method for object tracking at least one object in at least two recordings temporally following one after the other by means of a lighting device and an optical sensor, wherein a control of the lighting device and of the sensor are temporally coordinated with each another. A first coordinated control of the lighting device and of the optical sensor is assigned to a first visible distance range, wherein a first recording of the first visible distance range while illuminated by means of the lighting device is recorded with the optical sensor by means of the first coordinated control. If the at least one object is detected in the first recording within the first visible distance range, a distance measurement is carried out to determine the distance between the at least one detected object and the optical sensor. A second coordinated control of the lighting device and of the optical sensor and an assigned, second visible distance range are determined such that the object detected in the first recording is located in the center of the second visible distance range. A second recording of the second visible distance range while illuminated by means of the lighting device is then recorded with the optical sensor by means of the second coordinated control.

Using the method suggested here, it is advantageously possible to adjust the visible distance range to a detected object. The object detection and the coordinated control are thus coupled with each other via a feedback loop. The detected object is optimally lit due to the central positioning of the object within the visible distance range. Better semantic segmentation of downstream image processing is thus enabled due to this optimal lighting.

The distance determination between the detected object and the optical sensor is carried out by means of a suitable method. A suitable method of this kind is particularly known from the German laid-open application with the publication number DE 10 2020 002 994 A1.

In a preferred embodiment of the method, the first recording and the second recording are recorded within less than 0.1 seconds, particularly preferably within less than 0.01 seconds.

The method can be used particularly advantageously in automated vehicles, particularly automated trucks. Particularly while driving behind a driver without a high range requirement, objects that cannot be driven over arranged in the vehicle's own lane can be advantageously detected and/or tracked and/or classified by means of the method, particularly objects that are small in comparison with the size of the vehicle. The method enables a timely and appropriate reaction to detecting and tracking objects of this kind, and particularly to recognising a distance of the vehicle from these objects. Such an appropriate reaction can for example be emergency braking or taking an avoidance trajectory—optionally determined ad hoc.

Such small objects that cannot be driven over are typically also described as "lost cargo". However, such objects can also be people or animals lying in the road, particularly those who have been the victim of an accident.

The method for generating recordings by means of a temporally coordinated control of a lighting device and of an optical sensor is particularly a method known as a gated imaging method; the optical sensor is particularly a camera that is only sensitively switched in a particular limited period of time, which is described as "gated control", and the camera is thus a gated camera. The lighting device is correspondingly also temporally controlled only in a particular, selected interval of time to light up a scene on an object. The gated imaging method is particularly suitable in the event of poor visibility, particularly in the event of rain and/or fog, and during the night, as an image signal and a sensor noise can be separated from each other much better than in the case of standard cameras, particularly in the case of monocular cameras.

A predefined number of light pulses are particularly emitted via the lighting device, preferably having a duration between 5 ns and 20 ns. The beginning and the end of the exposure of the optical sensor is coupled with the number and duration of the emitted light pulses. As a result, a particular visible distance range can be recorded by the optical sensor via the temporal control of the lighting device on the one hand and of the optical sensor on the other, having a correspondingly defined spatial position, i.e., a particularly determined distance of the beginning of the distance range from the optical sensor and a particular width of the distance range.

The visible distance range is the range—on the object—in three-dimensional space that is depicted in a two-dimensional recording in an image plane of the optical sensor by the number and duration of the light pulses of the lighting device in connection with the start and the end of the exposure of the optical sensor by means of the optical sensor.

When the phrase "on the object" is used here and in the following, a region in actual space, i.e., on the actual object to be observed is meant. When the phrase "in the image" is used here and in the following, an image in the image plane of the optical sensor is meant. The visible distance range is given on the object. An assigned region in the image in the image plane corresponds to said visible distance range via the imaging laws and the temporal control of the lighting device and of the optical sensor.

Depending on the start and end of the exposure of the optical sensor after the start of the illumination by the lighting device, light pulse photons hit the optical sensor. The further away the visible distance range is from the lighting device and the optical sensor, the longer the temporal duration until a photon that is reflected in this distance range hits the optical sensor. The temporal distance between one end of the illumination and a beginning of the exposure thus increases the further away the visible distance range is from the lighting device and from the optical sensor.

It is thus particularly possible according to an embodiment of the method to define the position and spatial width of the visible distance range via corresponding suitable selection of the temporal control of the lighting device on the one hand and of the optical sensor on the other.

In an alternative embodiment of the method, the visible distance range can be predetermined, wherein the temporal coordination of the lighting device on the one hand and of the optical sensor on the other is thus determined and correspondingly predetermined.

The lighting device is a laser in a preferred embodiment. The optical sensor is a camera in a preferred embodiment.

It is provided according to a development of the invention that the object is detected in the second recording and a distance between the object and the optical sensor is determined. A continuous object detection and/or object tracking is thus possible by adjusting the visible distance range.

It is provided according to a development of the invention that the method for object tracking is carried out in an alternating manner for at least two different first visible distance ranges. At least two different objects can advantageously be detected and tracked with this development of the method. The corresponding second visible distance range is adjusted for each object of the at least two different objects depending on the distance measurement.

It is provided according to a development of the invention that the first control of the lighting device of the optical sensor is coordinated such that the first visible distance range assigned to the first coordinated control as a first first visible distance range, and additionally a second first visible distance range. A first recording of the first first visible distance range and of the second first visible distance range while illuminated by means of the lighting device is recorded with the optical sensor by means of the first coordinated control. If a first object is detected in the first recording in the first first visible distance range, a first distance measurement is carried out to determine a first distance between the optical sensor and the first object. Alternatively or in addition, if a second object is detected in the first recording within the second first visible distance range, a second distance measurement is carried out to determine a second distance between the optical sensor and the second object. The second coordinated control of the lighting device and of the optical sensor and the assigned second visible distance range as a first second visible distance range and a second second visible distance range additionally assigned to the second coordinated control are then determined in such a manner that the first object is located in the center of the first second visible distance range and/or the second object is located in the center of the second second visible distance range. A second recording of the first second visible distance range and of the second second visible distance range while illuminated by means of the lighting device is then recorded with the optical sensor by means of the second coordinated control. Two different objects can thus advantageously be detected and tracked simultaneously.

It is provided according to a development of the invention that the at least one detected object is classified, particularly by means of deep learning.

The object is also solved by creating a control device that is equipped to carry out a method according to the invention or a method according to one of the previously described embodiments. The control device is preferably designed as a computing device, particularly preferably as a computer or as a controller, particularly as a controller of a vehicle. The advantages particularly result in connection with the control device which were already explained in connection with the method.

The object is also solved by creating an object tracking device that has a lighting device, an optical sensor and a control device according to the invention or a control device according to one of the previously described exemplary embodiments. The advantages particularly result in connection with the object tracking device which were already explained in connection with the method and the control device.

The control device is preferably operatively connected to the lighting device on one hand and to the optical sensor on the other, and equipped for their control. In a preferred embodiment, the control device is additionally equipped to determine a distance between the optical sensor and the at least one detected object.

Finally, the object is also solved by creating a motor vehicle having an object tracking device according to the invention or an object tracking device according to one of the previously described embodiments. The advantages particularly result in connection with the motor vehicle which were already explained in connection with the method, the control device and the object tracking device.

The motor vehicle is embodied as a motor truck in an advantageous embodiment. It is also possible, however, that the motor vehicle is a passenger car, a utility vehicle or another motor vehicle.

The invention is illustrated in greater detail below by means of the drawings.

BRIEF DESCRIPTION OF THE DRAWINGS

FIG. 1 shows a schematic depiction of an exemplary embodiment of a motor vehicle having an exemplary embodiment of an object tracking device and a first recording of a first visible distance range; and FIG. 2 shows a schematic depiction of the motor vehicle having the object tracking device and a second recording of a second visible distance range.

DETAILED DESCRIPTION OF THE DRAWINGS

FIG. 1, a), shows a schematic depiction of an exemplary embodiment of a motor vehicle 1 having an exemplary embodiment of an object tracking device 3. The object tracking device 3 has a lighting device 5 and an optical sensor 7. The object tracking device 3 additionally has a control device 9 (only depicted schematically here) that is operatively connected to the lighting device 5 and the optical sensor 7 for their respective control (in a manner not explicitly depicted). A lighting frustum 11 of the lighting device 5 and an observation region 13 of the optical sensor 7 are particularly depicted in FIG. 1. A first visible distance range 15.1 that is a partial quantity of the observation region 13 of the optical sensor 7 is additionally depicted cross-hatched. An object 17 is partially arranged in the first visible distance range 15.1.

FIG. 1, b), shows a schematic depiction of a first recording 19.1 that has been recorded with the optical sensor 7 by means of a first coordinated control of the lighting device 5 and the optical sensor 7. The image of the first visible distance range 15.1 is labelled 15.1' in the first recording 19.1. The image of the object 17 is analogously labelled 17' in the first recording 19.1.

FIG. 2 is a depiction of a scene that immediately temporally follows the scene from FIG. 1. The temporal difference between the scene in FIG. 1 and the scene in FIG. 2 is preferably less than 0.1 s, particularly preferably less than 0.01 s.

FIG. 2, a), shows the motor vehicle 1 having the object tracking device 3. The object tracking device 3 has the lighting device 5 and the optical sensor 7. The object tracking device 3 additionally has the control device 9. Analogously to FIG. 1, the lighting frustum 11 of the lighting device 5 and the observation region 13 of the optical sensor 7 are particularly depicted in FIG. 2. A second visible distance range 15.2 that is a partial quantity of the observation region 13 of the optical sensor 7 is additionally depicted cross-hatched. The object 17 is located in the center of the second visible distance range 15.2.

FIG. 2, b), shows a schematic depiction of a second recording 19.2 that has been recorded with the optical sensor 7 by means of a second coordinated control of the lighting device 5 and of the optical sensor 7. The image of the second visible distance range 15.2 is labelled 15.2' in the second recording 19.2. Analogously to the latter and to FIG. 1, the image of the object 17 is labelled 17' in the second recording 19.2.

The object tracking and the adjustment of the second visible distance range 15.2 to the spatial position of the object 17 is carried out by means of the method described in the following.

A first recording 19.1 of the first visible distance range 15.1 is recorded by means of a first coordinated control of the lighting device 5 and of the optical sensor 7. An object 17 is detected in the first recording 19.1 in the image 15.1' of the first visible distance range 15.1. The distance of the object 17 from the optical sensor 7 is determined by means of a suitable method.

A second coordinated control and an associated second visible distance range 15.2 are determined on the basis of the distance measurement of the object 17 such that the object 17 is located in the center of the second visible distance range 15.2. Finally, a second recording 19.2 of the second visible distance range 15.2 while illuminated by means of the lighting device 5 is then recorded with the optical sensor 7 by means of the second coordinated control.

The distance of the object 17 from the optical sensor 7 can additionally be determined again in the second recording 19.2. The method for object tracking can additionally be continuously carried out with this renewed distance determination.

Alternatively or in addition, the detected object 17 can be classified, particularly by means of deep learning. It is thus advantageously possible to categorize the detected object 17, and to decide whether or not an object tracking is necessary.

The invention claimed is:

1. A method for tracking an object, comprising:
   temporally coordinating a lighting device and an optical sensor in accordance with a first control, wherein the first control temporally coordinates the optical sensor and the lighting device so as to capture a first recording of a first visible distance range illuminated by the lighting device;
   detecting the object in the first recording;
   determining, based on the first recording, a distance between the object and the optical sensor; and
   temporally coordinating the lighting device and the optical sensor, based on the determined distance between the object and the optical sensor, in accordance with a second control, wherein the second control temporally coordinates optical sensor and the lighting device so as to capture a second recording of a second visible distance range illuminated by the lighting device when the object is located in a center to the second visible distance range.

2. The method according to claim 1, further comprising:
   detecting the object in the second recording; and
   determining, based on the second recording, the distance between the object and the optical sensor.

3. The method according to claim 1, wherein the method for object tracking is carried out in an alternating manner for at least two different first visible distance ranges, wherein the at least two different first visible distance ranges includes: a primary first visible distance range, and a secondary first visible distance range.

4. The method according to claim 1,
   wherein the first control temporally coordinates the optical sensor and the lighting device so as to:
      capture a primary first recording of the primary first visible distance range illuminated by the lighting device, and
      capture a secondary first recording of the secondary first visible distance range illuminated by the lighting device;
   wherein the second control temporally coordinates optical sensor and the lighting device so as to:
      capture a primary second recording of a primary second visible distance range illuminated by the lighting device when the object is located in a center of the primary second visible distance range, and
      capture a secondary second recording of a secondary second visible distance range illuminated by the lighting device when the object is located in a center of the secondary second visible distance range.

5. The method according to claim 1, wherein the at least one detected object is classified by deep learning.

6. A control device configured to:
   temporally coordinate a lighting device and an optical sensor in accordance with a first control, wherein the first control temporally coordinates the optical sensor and the lighting device so as to capture a first recording of a first visible distance range illuminated by the lighting device;
   detect an object in the first recording;
   determine, based on the first recording, a distance between the object and the optical sensor; and
   temporally coordinate the lighting device and the optical sensor, based on the determined distance between the object and the optical sensor, in accordance with a second control, wherein the second control temporally coordinates optical sensor and the lighting device so as to capture a second recording of a second visible distance range illuminated by the lighting device when the object is located in a center to the second visible distance range.

7. An object tracking device (3), comprising:

a lighting device;

an optical sensor; and a control device configured to:
- temporally coordinate the lighting device and the optical sensor in accordance with a first control, wherein the first control temporally coordinates the optical sensor and the lighting device so as to capture a first recording of a first visible distance range illuminated by the lighting device;
- detect the object in the first recording;
- determine, based on the first recording, a distance between the object and the optical sensor; and
- temporally coordinate the lighting device and the optical sensor, based on the determined distance between the object and the optical sensor, in accordance with a second control, wherein the second control temporally coordinates optical sensor and the lighting device so as to capture a second recording of a second visible distance range illuminated by the lighting device when the object is located in a center to the second visible distance range.

* * * * *